(12) United States Patent  (10) Patent No.: US 7,520,231 B2
Bishop  (45) Date of Patent: Apr. 21, 2009

(54) WATERCRAFT LOCK

(76) Inventor: Richard B. Bishop, 5118 8th Ave. Dr. W., Bradenton, FL (US) 34209

( * ) Notice: Subject to any disclaimer, the term of this patent is extended or adjusted under 35 U.S.C. 154(b) by 18 days.

(21) Appl. No.: 11/740,833

(22) Filed: Apr. 26, 2007

(65) Prior Publication Data

US 2007/0251439 A1    Nov. 1, 2007

Related U.S. Application Data

(60) Provisional application No. 60/745,639, filed on Apr. 26, 2006.

(51) Int. Cl.
*B63C 7/00*    (2006.01)
(52) U.S. Cl. ............................ 114/44; 405/85
(58) Field of Classification Search ............... 114/44, 114/45, 48, 49; 405/1, 3, 4, 6, 84, 85, 86
See application file for complete search history.

(56) References Cited

U.S. PATENT DOCUMENTS

| | | | | |
|---|---|---|---|---|
| 882,501 | A * | 3/1908 | Jamison | 405/85 |
| 1,043,411 | A * | 11/1912 | Engstrand | 114/45 |
| 1,173,367 | A * | 2/1916 | Meacham | 405/85 |
| 1,886,965 | A * | 11/1932 | Meacham | 405/85 |
| 2,325,994 | A * | 8/1943 | Zoll | 405/3 |
| 3,390,530 | A | 7/1968 | Toben | |
| 3,398,540 | A | 8/1968 | Toben | |
| 3,656,305 | A | 4/1972 | Aubert | |
| 3,683,629 | A | 8/1972 | Paull et al. | |
| 3,686,871 | A | 8/1972 | Scholler et al. | |
| 4,275,973 | A | 6/1981 | Aubert | |
| 4,510,877 | A * | 4/1985 | Bloxham | 114/45 |
| 4,615,289 | A * | 10/1986 | Bloxham | 114/45 |
| 4,763,592 | A | 8/1988 | Russ | |
| 4,877,351 | A | 10/1989 | Enami | |
| 5,226,746 | A * | 7/1993 | Johnson | 405/3 |
| 5,295,762 | A | 3/1994 | Lopez et al. | |

(Continued)

FOREIGN PATENT DOCUMENTS

SU    550476    3/1977

(Continued)

OTHER PUBLICATIONS

Wikipedia, the free encyclopedia; Canal Lock; Mar. 13, 2006; web pp. 1-7.

(Continued)

*Primary Examiner*—Lars A Olson
(74) *Attorney, Agent, or Firm*—Steven M. Greenberg, Esq.; Mark P. Terry, Esq.; Carey, Rodriguez, Greenberg & Paul, LLP

(57) ABSTRACT

A watercraft transport lock includes a walled structure that can be filled and emptied of water received from two separate bodies of water for the purpose of transporting a boat or other watercraft between the two bodies of water. The system prevents the water of one body from mixing with the water of the other body. This is accomplished by removing the water of the first body of water from within the structure prior to filling the structure with the water from the other body. A boat support may be used to support the boat during the emptying and filling processes.

16 Claims, 11 Drawing Sheets

U.S. PATENT DOCUMENTS

| | | | | |
|---|---|---|---|---|
| 6,155,190 | A | * | 12/2000 | Cavanagh ............... 114/45 |
| 6,520,728 | B1 | * | 2/2003 | Schwitters ............... 114/44 |
| 6,811,354 | B2 | * | 11/2004 | Spani ............... 405/84 |
| 6,964,239 | B2 | | 11/2005 | Vinnik |
| 6,979,149 | B1 | | 12/2005 | Thompson |
| 2002/0119010 | A1 | | 8/2002 | Len-Rios |

FOREIGN PATENT DOCUMENTS

| | | |
|---|---|---|
| SU | 591553 | 2/1978 |
| SU | 1025789 | 6/1983 |
| SU | 1032091 | 7/1983 |

OTHER PUBLICATIONS

Derwent Abstract; Boat transfer lock-has additional fresh water galleries terminated with outlet duct preventing high level side contamination with salt water; Union of Soviet Socialist Republics Patent No. 550476; 1999; p. 1 (Submitted as translation of foreign patent document Cite No. 1).

Derwent Abstract; Ship navigation lock in fresh and salt water canals-has secondary fresh water gallery in central section of upper head coupled to lock chamber reducing lock size; Union of Soviet Socialist Republics Patent No. 591553; 1999; p. 1 (Submitted as translation of foreign patent document Cite No. 2).

Derwent Abstract; Fresh water cavity lock-has discharge and intake holes with diameters in given ratio; Union of Soviet Socialist Republics Patent No. 1025789; 1999; p. 1 (Submitted as translation of foreign patent document Cite No. 3).

Derwent Abstract; Lock water change over method-involves releasing lock chamber fresh water into antechamber and changing specific depth water layer with salt water; Union of Soviet Socialist Republics Patent No. 1032091; 1999; p. 1-2 (Submitted as translation of foreign patent document Cite No. 4).

* cited by examiner

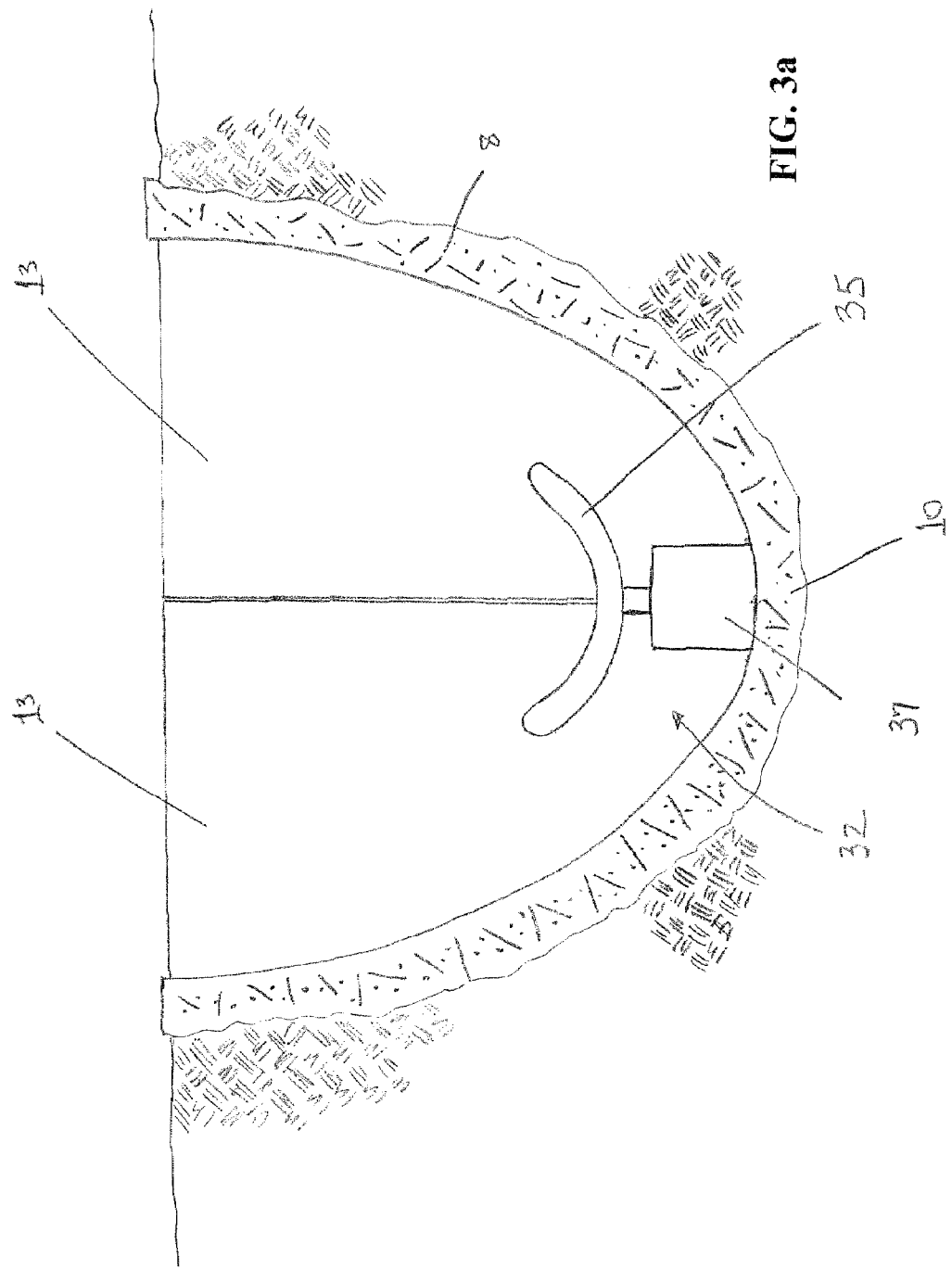

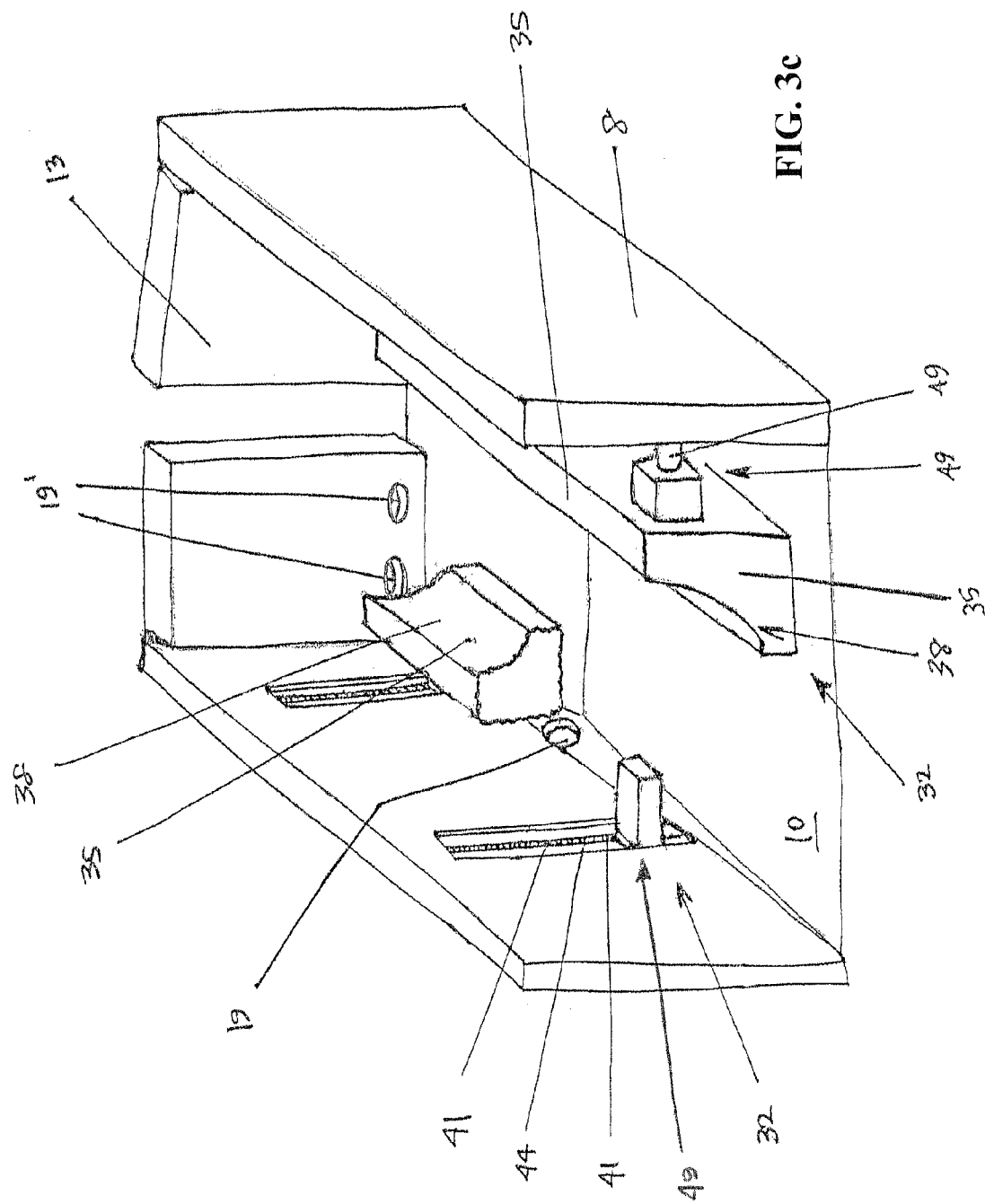

WATERCRAFT LOCK

This utility patent application claims priority to U.S. provisional patent application Ser. No. 60/745,639, filed Apr. 26, 2006.

TECHNICAL FIELD

The present invention relates to a watercraft transport system, and more specifically to a watercraft lock that allows a boat or other water vehicle to transition between two bodies of water.

BACKGROUND OF THE INVENTION

Boating is a very popular activity for many people. Some activities include traveling, fishing, cruising, and lounging. Boats are also used in commerce for transporting goods between destinations. Inland waterways and rivers are frequently traveled by boats and other watercraft. At times boaters may desire to navigate the boat out into the open waters of an adjacent lake or ocean. Accordingly it is desirable to travel from one body of water to another.

Some methods of transporting watercraft include boatlifts that pick the watercraft out from one body of water and place it into another body of water. However, these types of devices are not suitable for all types of watercraft, including boats that have masts, e.g. sailboats and yachts. These types of devices may also be limited by the size of the boats that the devices can lift.

One such device is found in U.S. Pat. No. 5,947,639 by the inventors of the embodiments of the subject invention. This patent discusses a new and improved boat lift capable of transporting a boat between two bodies of water in both a vertical and horizontal direction. The boatlift allows a boat to bypass various barriers in an efficient and safe manner by vertically lifting the boat out of one body of water, translating the boat horizontally over a desired barrier, and then vertically lowering the boat into a second body of water. Still, these devices require a significant amount of mechanical and structural framework that is susceptible to wear requiring maintenance.

Salt water or brackish water and fresh water are separated by various types of barriers. Barriers may be desired to separate these water bodies due to the various types of organisms, plants and animals which can only survive in either salt or fresh water, but not both. Regardless of the need to isolate salt from fresh water, boats and other types of water vehicles still require access to and from these separate bodies of water.

Canals provide means for transporting boats from one body of water to another. The Panama Canal, for example, was constructed to provide a shortened route between the Pacific and Atlantic oceans. Canals may utilize locks that raise and lower boats transporting the craft between water ways of different elevations. However, these devices do not prevent the water of one body from mixing with another body of water.

In light thereof, it would be desirable to have a watercraft transport system that obviates the deficiencies in the prior art, including transporting a boat or other watercraft from one body of water to another without mixing the water between the two bodies. The embodiments of the subject invention accomplish this task.

BRIEF SUMMARY

A particular embodiment of the present invention includes a watercraft transport lock operating between two bodies of water, the transport lock comprising: a water-retaining chamber having a pair of sidewalls, a first end having an at least one door operating between the chamber and a first body of water, and a second end having an at least one door operating between the chamber and a second body of water; a watercraft cradle configured to at least partially support an associated watercraft; and, a first pump fluidly communicated to displace water from the water-retaining chamber.

An additional embodiment of the present invention includes a method of transporting a boat between a first body of water and a second body of water, the method comprising the steps of: maneuvering a watercraft into a water-retaining chamber of a lock from a first end of the chamber, the lock including: the water-retaining chamber having the first end and a second end, each end including an at least one door that operates between an open and closed position, the first end located between a first body of water and the chamber, the second end located between a second body of water and the chamber; and, a first pump fluidly communicated to displace water from the water-retaining chamber; closing the at least one door of the first end, thereby maintaining a volume of water and the watercraft within the chamber; pumping substantially all of the volume of water from the water-retaining chamber; filling the chamber to a desired level with water from the second body of water; opening the at least one door of the second end; and maneuvering the watercraft from the chamber and into the second body of water.

An additional embodiment of the present invention includes a method of transporting a boat between a first body of water and a second body of water, the method comprising the steps of: pumping substantially all of the volume of water from a water-retaining chamber of a lock, the lock including: the water-retaining chamber having a first end and a second end, each end including an at least one door that operates between an open and closed position, the first end located between a first body of water and the chamber, the second end located between a second body of water and the chamber; and, a first pump fluidly communicated to displace water from the water-retaining chamber; filling the chamber to a desired level with water from the first body of water; and, opening the at least one door of the first end; maneuvering a watercraft into a lock from the first end; changing the water level within the chamber to a desired water level; opening the at least one door of the second end; and, maneuvering the watercraft from the chamber and into the second body of water.

These and other advantages will be apparent upon a review of the detailed description of the invention.

BRIEF DESCRIPTION OF THE DRAWINGS

FIG. 3a is a partial cutaway end view of the watercraft lock showing the cradle according to an embodiment of the present invention.

FIG. 3c is a partial cutaway perspective view of the watercraft lock showing another embodiment of the cradle.

DETAILED DESCRIPTION OF THE INVENTION

Figure 1:
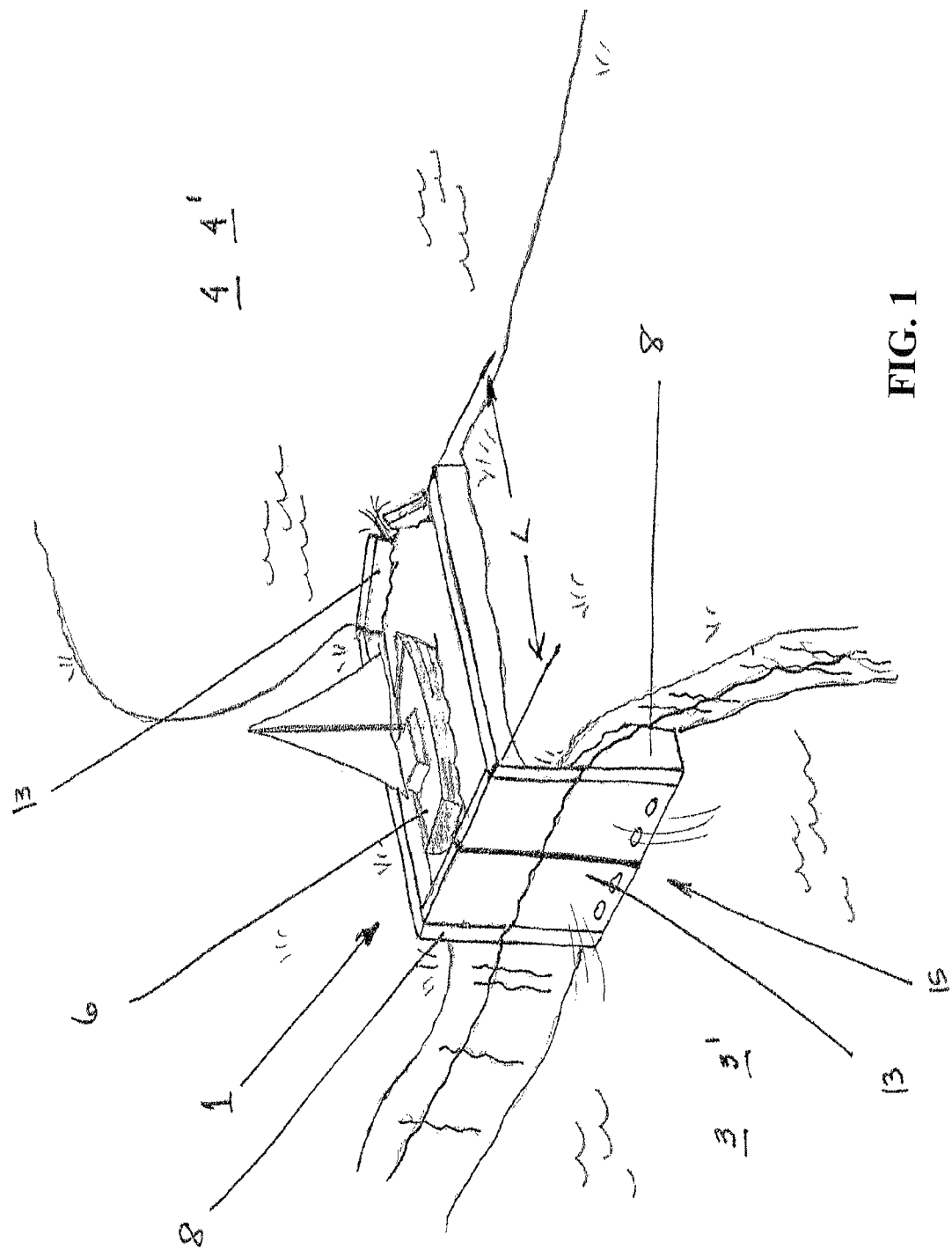
FIG. 1 is a perspective view of the watercraft lock spanning the region between two bodies of water according to an embodiment of the present invention.

Referring now to the drawings, wherein the showings are for purposes of illustrating embodiments of the invention only, and not for purposes of limiting the same, FIG. 1 shows a watercraft transport system or lock depicted generally at 1. The transport system 1, or watercraft lock 1, may be situated between two bodies of water 3, 4, such as for example an inland waterway 3' and the ocean 4'. In one embodiment, the first body of water 3, or water source 3, may be different in salination content than the second body of water 4, or second source 4. Alternatively, the bodies of water 3, 4 may both contain fresh water or salt water, or one may contain brackish water and the other salt water. Such instances may occur when one fresh water body is distinctly isolated from a second substantially fresh water body that may intermix with a salt water source. Generally, the watercraft lock 1 may operate to limit the introduction of water from any water body into another as desired, and, in one embodiment, may limit the introduction of salt water or brackish water into the fresh water body. This may be desirous to protect the native animal and plant life, as salt water or brackish water may harm the natural inhabitants of the fresh water body. It will be realized by a person of ordinary skill in the art that introduction of fresh water into a salt water body may not have the same detrimental effect. In any instance, the embodiments of the subject invention may pertain to any bodies of water between which it is desired to isolate water sources and transport a watercraft 6 including but not limited to lakes, rivers, reservoirs, seas, oceans and the like, regardless of the salination levels and/or differences. Therefore, the watercraft lock 1 may function to limit the intermixing of water from one water body with an adjacent body of water during transportation of a water vehicle therebetween. It is noted here that the surface level of two sources 3, 4 of water may also be at different elevations whereby the watercraft lock 1 may compensate for different water levels when transporting a watercraft from one body of water to the other as will be discussed in detail in the following paragraphs. The watercraft lock 1 may span the distance between the sources 3, 4 of water. In the current embodiment, the water sources 3, 4 are shown directly adjacent the inlets or doors of the watercraft lock 1. In this manner, the length of the watercraft lock 1 may be any length as required to span the entire distance between the two sources 3, 4. Further, the watercraft lock 1 may comprise a segment of a longer waterway passage between water sources 3, 4. Accordingly other water ways may lead up to the watercraft lock 1 thereby minimizing the overall cost of constructing the watercraft lock 1 and the amount of water that may be pumped in and out of the watercraft lock 1. In any case, the watercraft lock 1 provides a channel through which watercraft 6 may pass through without substantially mixing the sources of water 3, 4.

Figure 2:
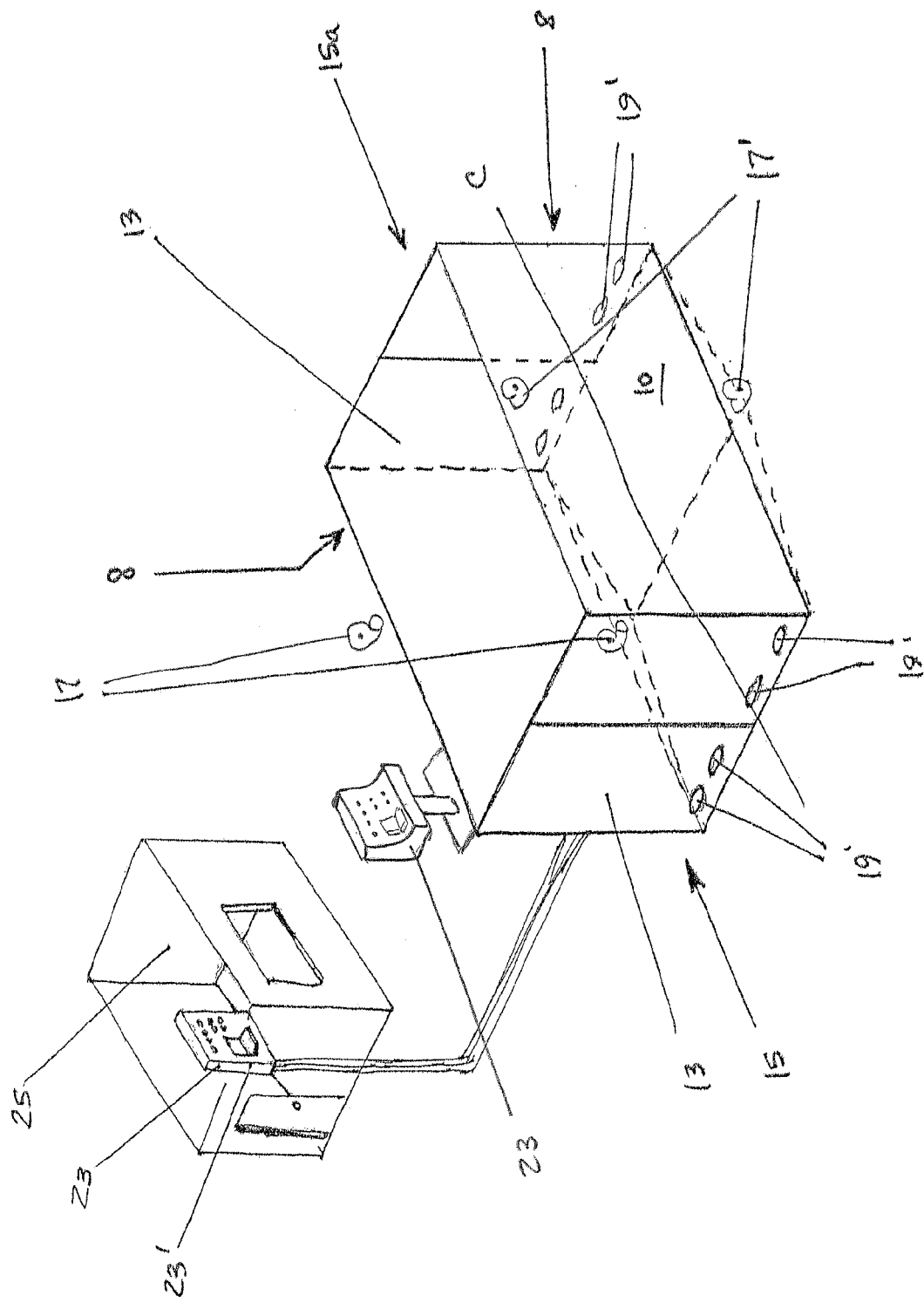
FIG. 2 is a schematic representation of the watercraft lock according to an embodiment of the present invention.
Figure 3:
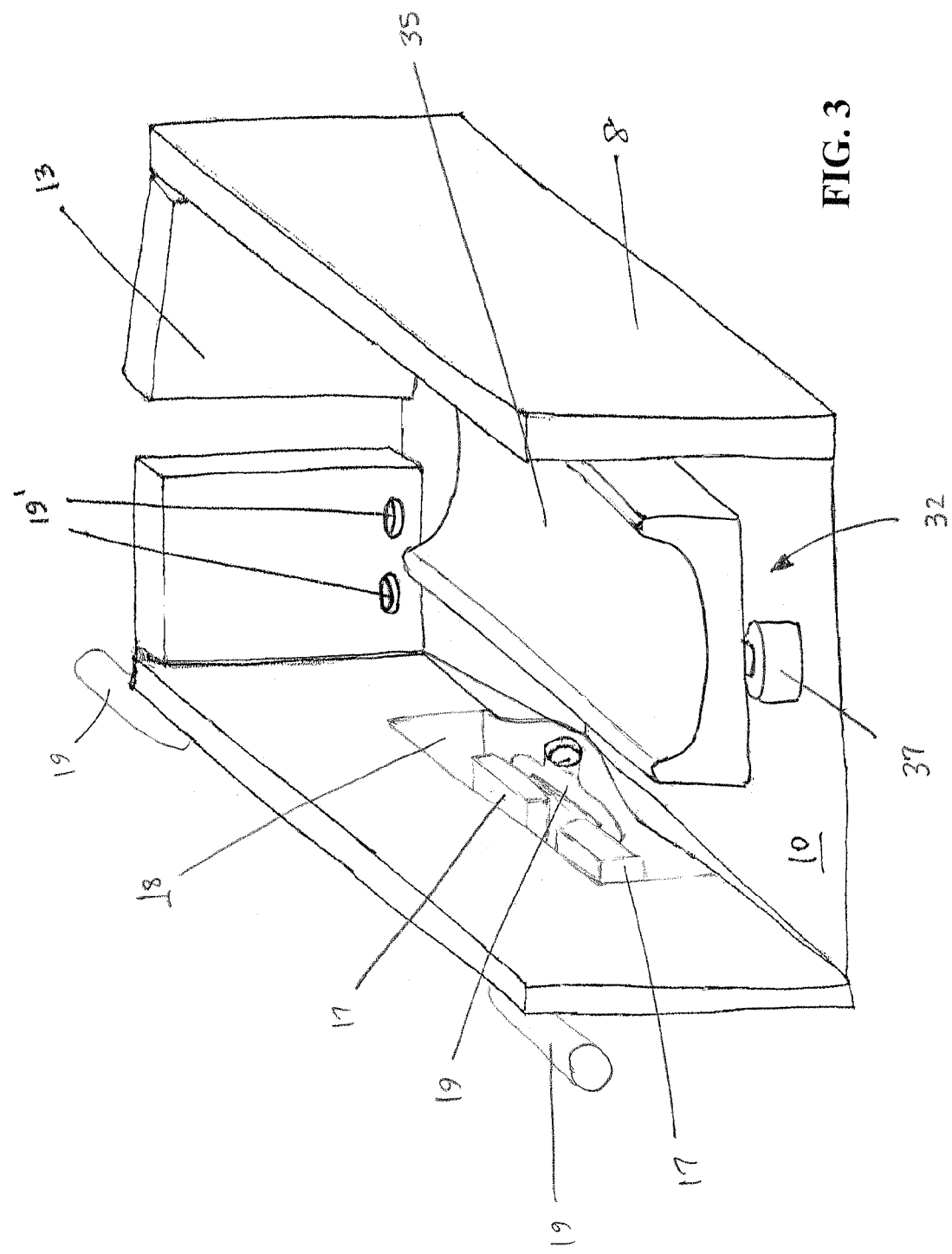
FIG. 3 is a partial cutaway perspective view of the watercraft lock showing a cradle according to an embodiment of the present invention.
Figure 4A:
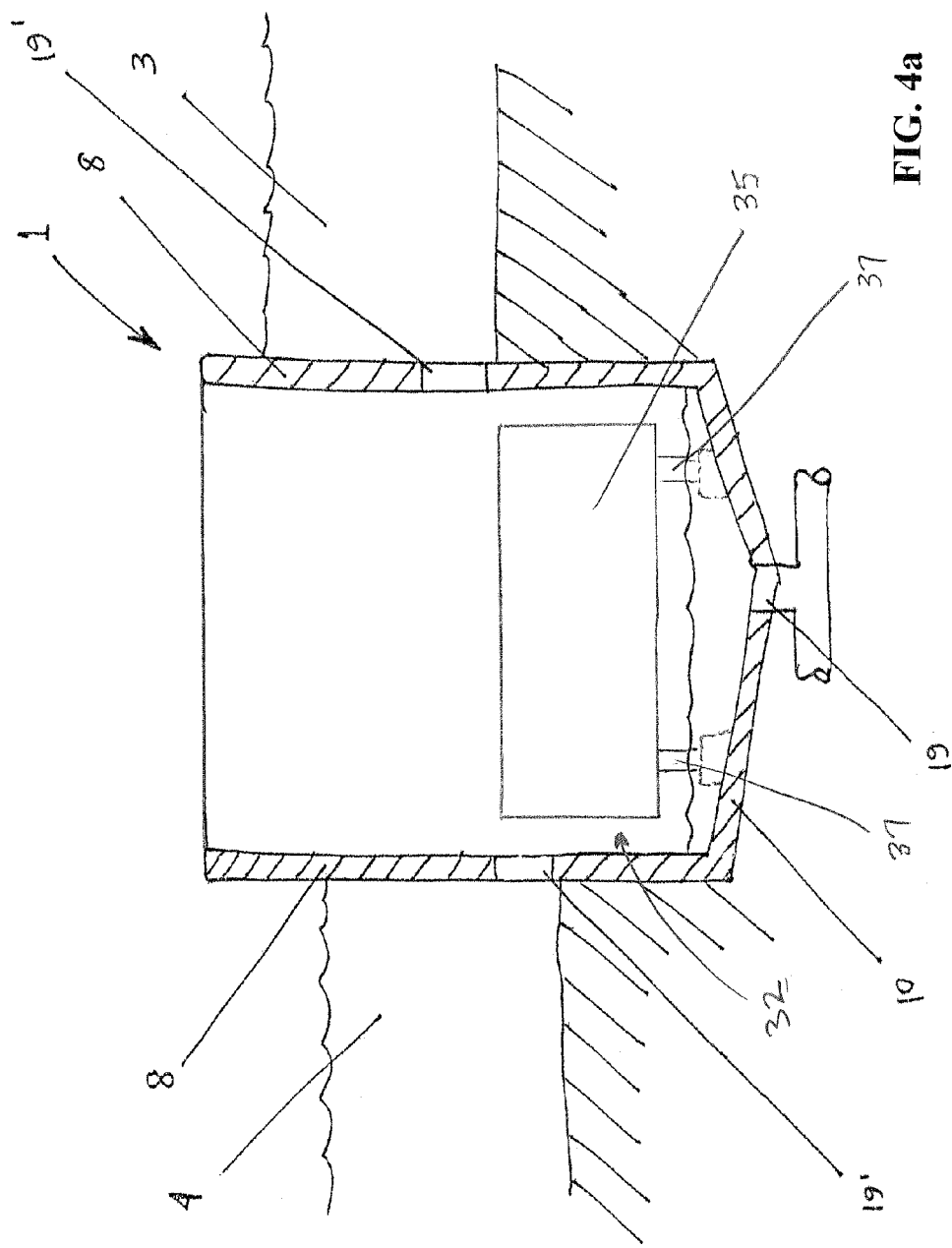
FIG. 4a is a partial cutaway side view of the watercraft lock according to an embodiment of the present invention.
Figure 4B:
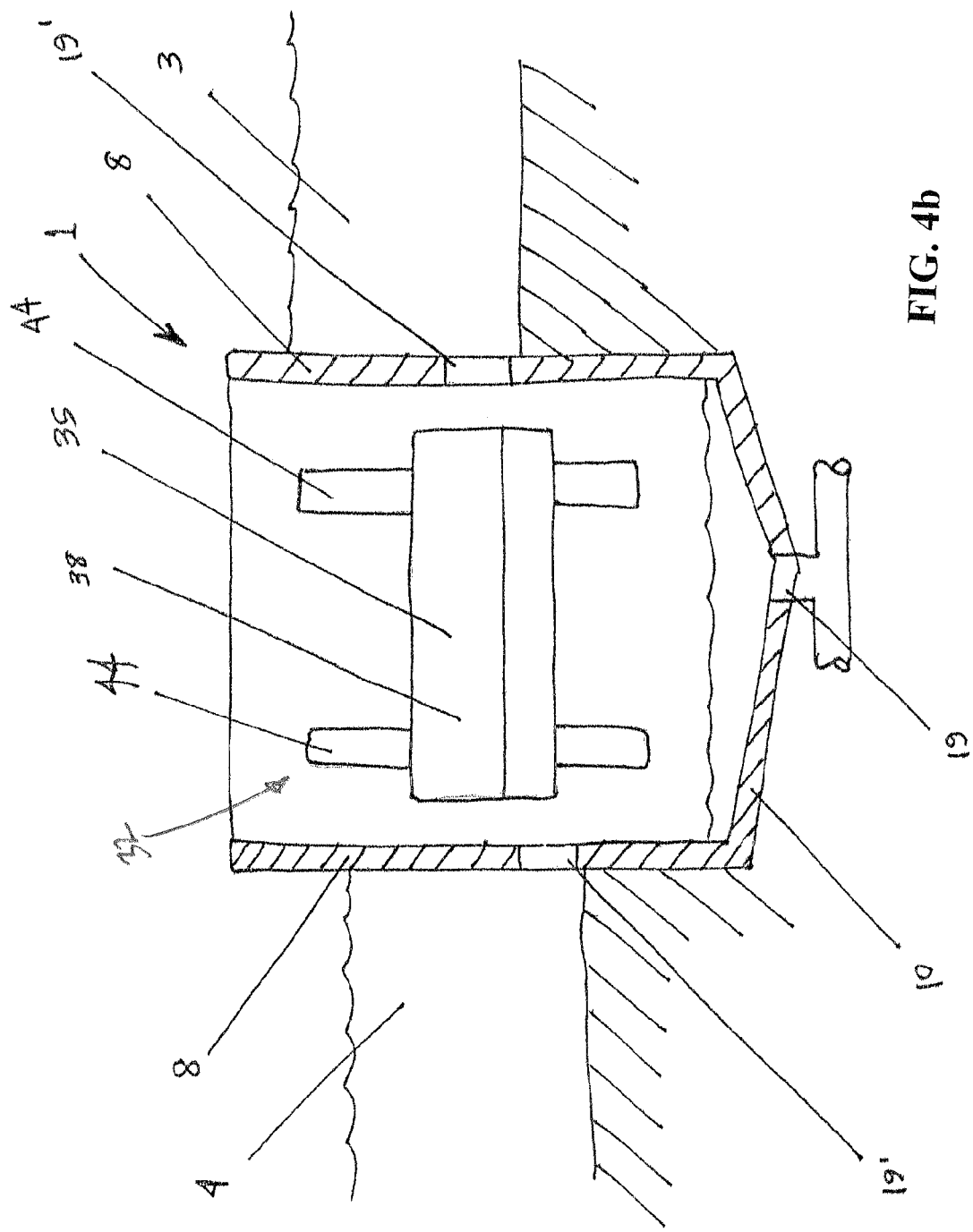
FIG. 4b is a partial cutaway side view of the watercraft lock according to an embodiment of the present invention.

With continued reference to FIG. 1 and now to FIGS. 2 through 4, the watercraft lock 1 may include sidewalls 8 that support the overall structure of the watercraft lock 1. The sidewalls 8 may be constructed of concrete or sprayed concrete, each of which may be reinforced, providing a sturdy structure onto which the remaining components of the watercraft lock 1 may be connected. The sidewalls 8 may be prefabricated and assembled in place after the ground has been prepared or excavated. Alternatively, the sidewalls 8 may be fabricated on site where concrete is mixed and poured into frames outlining the desired shape of the sidewalls 8. The shape of the sidewalls 8 may be straight or box-like. The sidewalls 8 may also be slanted or curved horizontally or vertically, and may be fashioned, for example, so as to correspond to the shape of the cradle 32 or to any of a variety watercraft types for the purpose of reducing the amount of water contained within the lock 1, or the water-retaining chamber formed therein. The surface of the sidewalls, and especially the surface portion that comes into contact with the water sources 3, 4, may be treated or coated with a substance that prevents or aids in preventing the water from deteriorating the sidewalls 8. Other types of materials may be used to construct the sidewalls 8 including but not limited to corrosion resistant metal alloys, stone, or any other material chosen with sound engineering judgment. However, it is to be construed that any type of material suitable for constructing the sidewalls 8 for use in a water-based environment may be utilized. The watercraft lock 1 may also comprise a base, floor, or bottom 10 extending between the sidewalls 8. The base 10 may be fabricated on site or prefabricated in a manner similar to that of the sidewalls 8 described above. In one embodiment, the base 10 may be tapered, pitched, or inclined to assist the watercraft lock 1 in draining water and/or maintaining support of the watercraft traveling therethrough as will be discussed further in a subsequent paragraph. The pitch may result in a drainage trough or channel, which may extend anywhere along the base 10, including running centrally or along the sidewalls, or longitudinally or laterally, or anywhere there between. The drainage tough or channel may lead to a pump or a conduit in communication with a pump.

As mentioned above, the region of ground between the water sources 3, 4 may be excavated for construction of the watercraft lock 1. In another embodiment, the sidewalls 8 may be formed by dispersing or spraying an aggregate, which may be concrete, mortar, or any other material suitable for constructing a watercraft lock 1, over the excavated ground and left to cure or harden forming the floor 10 and/or sidewalls 8. In preparation for applying the aggregate, the ground may be contoured in any manner desired and suitable for constructing a watercraft lock 1. For example, the contour of the floor 10 and/or the sidewalls 8 may be fashioned to correspond to the type of the watercraft 6 that will be using the watercraft lock 1 and/or the shape of the cradle 32 used to support the watercraft 6 during transportation through the watercraft lock 1. In this manner, the volume within the watercraft lock 1 may be minimized thereby reducing the amount of water that is pumped in and out of the watercraft lock 1. As such, the sidewalls 8 and base 10 may be supported by the natural underlying geological foundation in the earth. It is contemplated that the sidewalls 8 and the base 10 may be reinforced by frame members, which may comprise steel rods, mesh, or beams, fibers, or prefabricated concrete pillars, installed into the excavated ground prior to spraying the aggregate. In this manner, the frame members may be used to support the doors 13 or other equipment used in conjunction with the watercraft lock 1. Still, it is contemplated that any means of constructing the watercraft lock 1 and supporting its components may be chosen as desired, for use with the embodiments of the subject invention. It is noted that the watercraft lock 1 may be dug deeper than a conventional canal lock. The depth of a conventional lock may match the lower of two adjoining water channels. This works well for its intended purpose but does not limit the intermixing of water between the two channels. In an embodiment of the subject invention, the watercraft lock 1 may extend below both of the adjacent water bodies 3, 4. This allows the quick refilling of the lock chamber or interior region with water from either water body, of which a detailed discussion of draining and refilling the watercraft lock 1 will be described further in subsequent paragraphs.

With continued references to FIGS. 1 and 2, moveable end portions, which may be doors 13, may be included at distal ends 15, 15*a* of the watercraft lock 1. The doors 13 may be comprised of door segments that swing into and out of engagement with each other to create a selectively openable passage or entrance/exit way through which the watercraft 6 may traverse the watercraft lock 1. In this manner, the doors 13 or door segments may function to substantially limit the flow of water from the surrounding water sources 3, 4 into the interior region of the watercraft lock 1 during a refill operation. In one embodiment, the doors 13 may be hinged to the sidewalls 8 or frame members, and swing outward from the watercraft lock 1. In an alternate embodiment, the moveable end portions may comprise a single door 13, which may be hinged with respect to the sidewalls 8 or alternatively may include a sliding door that moves vertically up and down. It is noted that the vertically sliding door may reduce the amount of force required to open the door as vertical movement reduces the amount of water pushing against the door as it is being opened and closed. However, any means of configuring the doors 13 for movement between an open position and a closed position may be chosen with sound engineering judgment. Doors 13 may be made from any known material and process.

As mentioned, the doors 13 may substantially inhibit water from entering or exiting the interior region of the watercraft lock 1. As such, the doors 13 may be constructed to interlock thereby substantially preventing water from passing through the doors when closed. Alternatively, pliable material may be situated between the door edges and sidewalls 8 to seal or otherwise limit water from leaking through. As such, a substantially water-tight seal or sealing member may be disposed between the doors and/or sidewalls 8 and base 10 of watercraft lock 1 to prevent any significant quantity of water from either water source 3, 4 from entering the watercraft lock 1. However, any means may be used to substantially limit water from passing through doors 13 when the watercraft lock 1 is in operation.

The watercraft lock 1 may be filled by opening the doors 13 adjacent to the water body, which the watercraft 6 will pass into. This allows the interior region of the watercraft lock 1 to fill quickly with water from the appropriate water source 3, 4. Accordingly, one or more prime movers, which may be electric motors, may be incorporated for opening and closing the doors 13 as desired. In addition to, water conduits or culverts 19' may be installed in the doors 13 of the watercraft lock 1 to refill the watercraft lock 1. The culverts 19' may also be installed in the sidewalls 8 of the watercraft lock 1 in addition to or substitution of the culverts 19' in the doors 13. The culverts 19' may comprise tubes for channeling water from the water sources 3, 4 to the interior region of the watercraft lock 1. The culverts 19' may be selectively opened and closed, such as by a controller 23. In this manner, the culverts 19' may include selectively openable gates. Any type of culvert 19' and any manner of selectively opening and closing the culverts 19' may be chosen as is appropriate for use with the embodiments of the subject invention. Provided the watercraft lock 1 is lower than either water body, water from either water body 3, 4 may quickly refill the interior region of the watercraft lock 1 when the culverts 19' are opened. Further, open culverts will lower the water resistance on the doors when the doors are being open or closed, as the culverts reduce the surface are of the door and allow water to otherwise flow through the door, as opposed to being pushed by the door.

With continued reference to FIG. 2 and now to FIG. 3, the watercraft lock 1 may function to substantially drain and refill the water within the interior region of the watercraft lock 1. In one embodiment, the watercraft lock 1 may include pumps 17 communicated to the interior region, or the water-retaining chamber, of the watercraft lock 1 through one or more water conduits 19. The water conduits 19 may be positioned in the base or floor 10 or sidewalls 8 in any manner suitable for draining and filling the interior region of the watercraft lock 1. In is contemplated that any number of pumps 17 may be used to pump water to and from the lock 1, with each pump being located at any location in lock 1, at any elevation along sidewall 8, and anywhere along the bottom 10. Further, the pumps 17 may be installed in a region providing convenient access thereto for maintenance or other purposes, which includes without limitation a location adjacent the sidewalls 8 near the bottom or the top thereof which for example may be in a pump room 18 or sump extending from or into the sidewall 8. The pumps 17 may be positioned at the bottom of or beneath the watercraft lock 1 or at any elevation that is appropriate for use with the embodiments of the present invention, including a top area of the lock. The pumps 17, which may comprise any type of pumping means including but not limited to centrifugal pumps, may be communicated with the conduits 19 for pumping water out of the interior region of the watercraft lock 1. However, it is also contemplated that the pumps 17 may function to pump water into the interior region of the watercraft lock 1, in addition to selectively openable culverts 19', fashioned in the doors 13 or sidewalls 8, which provide a gravity-feed energy efficient way to refill the watercraft lock 1. The pumps 17 and/or conduits 19 may be selectively independently communicated to each of the water sources 3, 4. In this manner, water from a first source that has naturally entered the watercraft lock 1 with the watercraft 6 may be drained from the interior region of the watercraft lock 1 back into the body from which it came thereby substantially emptying the interior region of water altogether. This way water from the interior region, which has naturally entered with the watercraft 6 from one water body, will not intermix with the water in the body that the watercraft is being transported into. In the case where the watercraft is being transported from a fresh water source to a salt water or brackish water source, or between a brackish water source and a salt water source, intermixing may be less critical to the natural conditions of the salt water or brackish water source. As such, the water in the interior region may not be drained other than to compensate for differing water levels between the two bodies. However, in the reverse situation where the watercraft 6 is being transported from the salt water or brackish water source to the fresh water source, it may be desirable to substantially drain the water from the interior region and refill the interior region with water from the fresh water source thereby preventing a substantial quantity of salt water or brackish water from intermixing with the freshwater body when the doors 13 are opened and the watercraft 6 is released into the fresh water body. Valves, not shown, or other similar devices may be used to selectively and independently route the water being pumped through the conduits 19, 19' to, for example, each source or body of water. Subsequently, selected culverts 19' may be opened thereby allowing water from the second source to refill the interior region thus preventing cross contamination of the water sources 3, 4 when the watercraft 6 is released into the second water source or body. Of course, it will be realized that during the draining and refilling process, the doors 13 of the watercraft lock 1 will be closed to substantially limit unwanted water from the respective source from entering the interior region of the watercraft lock 1. As mentioned above, the base 10 may be tapered, pitched, or inclined laterally, longitudinally, or at any angle there between to ensure that the maximum amount of water is drained from the interior region of the watercraft lock 1. Any amount of taper may be chosen as is appropriate for use with the embodiments of the subject invention. In the case, where the base 10 is laterally tapered, the taper may be particularly steep extending from both sides and centered along a centerline C so as to allow the keel of the watercraft to pass through without contact with the watercraft lock 1. In this manner, any degree and depth of taper may be chosen with sound engineering judgment. It is also contemplated that the taper may directed to one of either side the watercraft lock 1.

It is contemplated that any number of pumps may be utilized in water lock 1. For example, two pumps 17, 17' may be used to drain water from the interior region. The first pump 17 may be used exclusively to pump water to and/or from the fresh water source, whereas the second pump 17' may be used only in conjunction with the salt water source. Operation of the pumps 17, 17' may therefore be isolated with respect to the other and may be operated independently of the other. In this way, the pumps 17, 17' may be set up with separate operating switches, not shown, for manual activation by the operator. Alternatively, the controller 23 may be programmed to automatically operate the respective pump based on a specific sequence of operation. For example, when the watercraft 6 enters the lock 1 from a first water body, the controller 23 may set a flag that triggers activation of the first pump during the draining sequence. Similarly, entrance from the other water source may automatically trigger operation of the second pump. In this way, separate pumping systems, i.e. pumps, conduits, valves and the like, may be included in the watercraft lock 1 for each water source. Accordingly, the components may comprise separate water flow circuits that connect one water source to the interior region through the first pump and likewise a second water source to the interior region through the second pump. While the pumps 17, 17' may be operated independently and only for use with a particular water source, it is also contemplated in another embodiment that the pumps 17, 17' may work together in tandem for pumping water to either water source. The pumps 17, 17' may still be selected for operation primarily with a particular source as previously described. However, when designated the pumps 17, 17' may operate together to pump water from the interior region into the respective water source. The respective water flow circuits may therefore be selectively interconnected for use in facilitating tandem operation of the pumps. This provides added flow capacity for draining the water faster. Additionally, having more than one pump provides redundant back up in the event that one of the pumps should require replacement or repair. It will be appreciated that any number of pumps and water flow circuits may be included without departing from the intended scope of the embodiments of the subject invention. The conduits and valves may also be configured in any way that facilitates the selective operation of the one or more pumps separately and/or in tandem.

With reference again to FIG. 2, the components of the watercraft lock 1 may be controlled by a transport system controller 23. The controller 23 may be situated adjacent to but separate from the watercraft lock 1, such as, for example on a terminal stand or in a control room 25 or other structure. Alternatively, the controller may be placed in a control cabinet positioned adjacent to the watercraft lock 1. However, the controller 23 may be installed at any location suitable for operating the watercraft lock 1. It is contemplated that one may be in remote or wireless communication with controller 23, and may control the lock 1 thereby. The various components of the watercraft lock 1, including but not limited to the pumps 17, culverts 19', and means for opening and closing the doors 13, may be communicated to and remotely operated by the controller 23. In one embodiment, a logic controller 23' may be used to sequence through a series of steps for operating the watercraft lock 1. Accordingly, sensors may be used to indicate when a previous step has been completed thus signifying the start of the next step in the sequence. Sensors may include proximity sensors or limit/trip switches. However, any type of sensor may be used to indicate the operating conditions of the watercraft lock 1. Sensors may also be used to sense the level of and rate of change of the water height within the lock 1 within each body of water adjacent lock 1. Additionally, sensors may be used to detect the position of the doors and the speed at which they are opening. Flow sensors may also be used to determine the rate of flow through the conduits and/or culverts 19. It is noted here that as some or all of the sensors may come into contact with the water, sensors may be chosen that are resistant to water damage, e.g. water pressure or corrosion. In this manner, operation of the watercraft lock 1 may be automated meaning that the controller 23, 23' and the sensors may function to cycle through operation of the watercraft lock 1 without significant operator interaction. However, any type of control system may be utilized with the embodiments of the subject invention including a manual system requiring significant operator involvement. It is noted that the manual system may utilize sensors and a logic controller. The system may display or indicate a specific condition signaling the operator to manually initiate the next step of operating the watercraft lock 1.

Figure 3B:
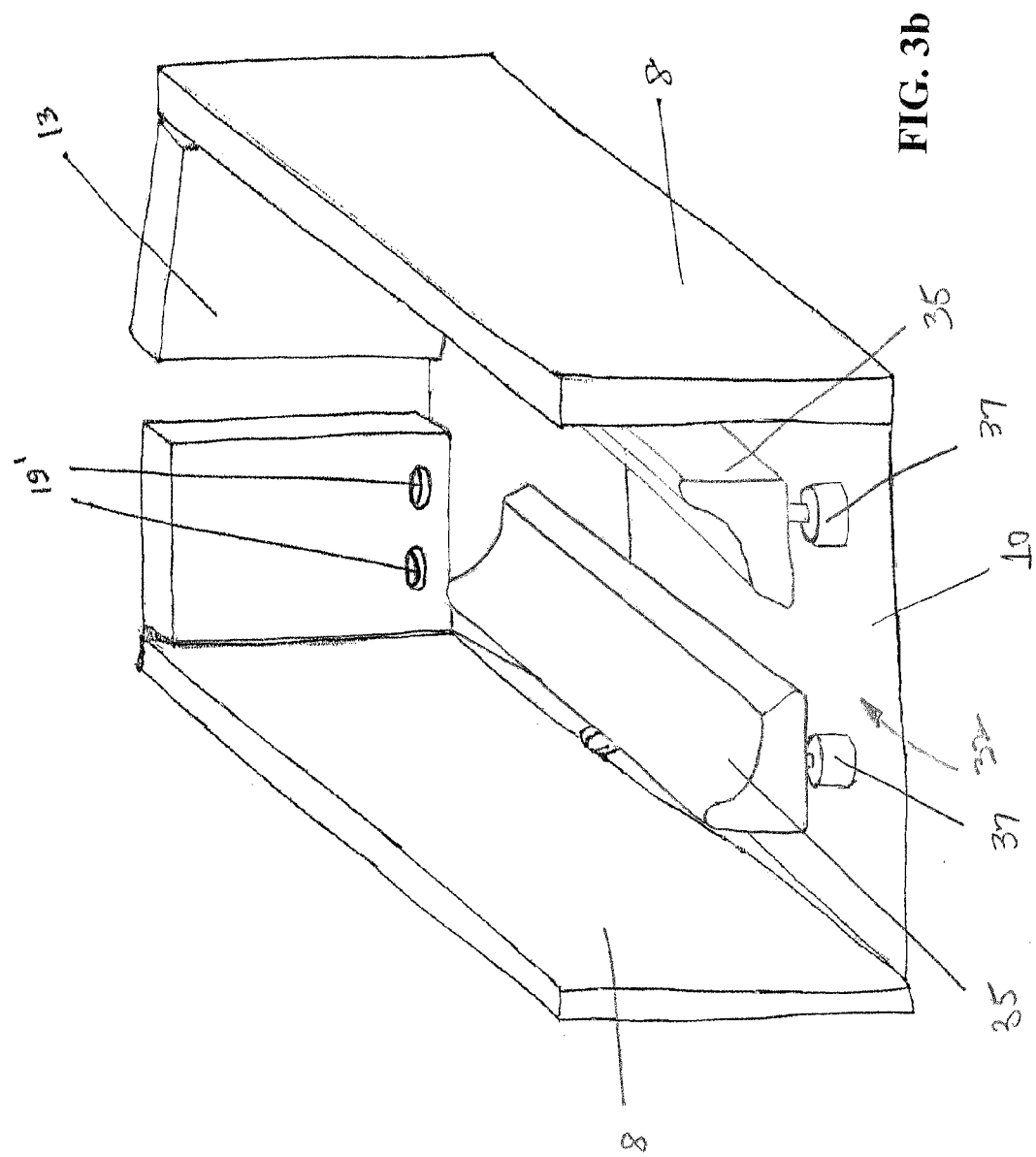
FIG. 3b is a partial cutaway perspective view of the watercraft lock showing a cradle having multiple sections according to an embodiment of the present invention.

With reference now to FIGS. 3, 3*a* and 3*b*, it will be realized that once the water in the interior region of the watercraft lock 1 has been substantially drained, means for supporting the watercraft 6 may be desired until water from the opposite source refills the interior region of the watercraft lock 1. A support system, shown generally at 32, is located in the interior region of the watercraft lock 1. The cradle 32 may be comprised of a generally longitudinal support member 35 configured to support the bottom of the watercraft 6 during the draining and refilling of water in the interior region of the watercraft lock 1. The support member 35 may be constructed so that the cross section corresponds to the type of watercraft 6 passing through the watercraft lock 1. For example, the cross section may be U-shaped or V-shaped. However, any configuration of the support member and its cross section may be chosen with sound engineering judgment as is appropriate for use with the embodiments of the subject invention. The support member 35 may be stationary. In other words, the support member does not move relative to the base 10 or the level of water in the interior region. Noting that the watercraft 6 is buoyant, as the level of the water decreases, the watercraft 6 will naturally lower itself onto the support member 35. It follows that as the cross section of the support member 35 may be contoured, the watercraft 6 will seat itself onto the support member 35. Alternatively, the support member 35 may ride on spring loaded rod members that offset the weight of the watercraft 6 when resting on the support member 35. In another embodiment, the support member 35 may be selectively moveable to engage and disengage to the watercraft hull as may be required. Accordingly, actuators may be positioned under the support member 35 for moving it in the vertical direction. One type of actuator may include a cylinder 37 for raising and lowering the support member 35 and associated watercraft 6. First and second cylinders may be used at distal ends of the support member 35 for keeping the support member 35 substantially level during operation. In one embodiment, the cylinders 37 may be pneumatic. Alternatively, the cylinders may be hydraulic, and more specifically water hydraulic. Still, any quantity and/or type of actuators may be used actuate the support member 35 as is appropriate for use with the embodiments of the present invention. It is also contemplated that support member 35 may be formed of separate sections, such as halves or quarters, which may be independently operated. Accordingly, actuators may be connected to each section as is appropriate for raising and lowering the sections, which may be beneficial when accepting watercraft 6 with downwardly extending hull extensions or protrusions. The support member 35 may be curved or straight or have any other shape suitable for cradling various type and sizes of watercraft 1. The support member 35 may also include pads or bumpers, which may be made from foam, rubber, plastic, or any other suitable material. Likewise, as the support members 35 contact the surface of the watercraft, it may be desirable to prevent the support members 35 from scratching the bottom of the watercraft by installing bumpers or pads, made from carpet, rubber, plastic or the like onto the contoured portions 38 of the support members 35. Alternatively, it is contemplated that the support members 35 may be generally constructed from a material, or be coated with a material, conducive to preserving the surface finish of watercraft 6, again, such as foam, rubber, plastic, or any other suitable material. It is also contemplated that the sidewalls 8 may be shaped and designed to accept a watercraft 6 and operate as the cradle 32, which may include attaching pads or bumpers thereto to cushion and protect the watercraft 6. Further, side supports may extend from the sidewalls 8 and be used to center or otherwise stabilize the watercraft before or while in the cradle 32. Such side supports may comprise any structural object, including a cylinder.

With reference now to FIG. 3c, another embodiment of the support system 32 or cradle 32 will now be described. The support system 32 or cradle 32 may comprise two generally symmetrical longitudinal support members 35. In one embodiment, the support members 35 may include a contoured surface portion 38, which may be configured to receive the bottom of one or more watercraft traveling through the watercraft lock 1. The contoured portion 38 of the support members 35 may be fashioned in any manner including but not limited to a straight angled surface, a curved surface having a constant radius of curvature, or a curved surface having a continuously changing radius of curvature. However, it is to be construed that any configuration of contoured portion 38 may be chosen as is appropriate for use with the embodiments of the subject invention. It will be appreciated that one or more contoured support members 35 may cradle the bottom of any given watercraft safely supporting a variety of watercraft configurations.

The support system 32 may further include actuators for moving the support members 35 into and out of engagement with the watercraft 6. The actuators may function to maneuver the support members 35 up or down and/or in and out. Additionally, the support members 35 themselves may be pivotally attached with respect to the actuators thereby allowing the contoured portion 38 of the support members 35 to pivot into secure contact with the bottom of the watercraft 6.

In this manner, the support members 35 may be universal support members 35 designed for contact with a wide range of watercraft 6. A first actuator 41, or set of actuators, may be positioned within columns 44 fashioned in the sidewalls 8 of the watercraft lock 1. The first actuator 41, or lift actuators 41, may raise and lower the support systems 32. The support system 32 may further include side actuators 49 that function to move the support members 35 laterally inward and outward with respect to a centerline C of the watercraft lock 1. The side actuators 49 may comprise cylinders 49' powered by hydraulics, which may include water based fluid power for an environmentally friendly system 32. Multiple side actuators 49 may be used and positioned along the length of the support members 35. The side actuators 49 may be affixed to the support members 35 via fasteners. Although any means of connecting the side actuators 49 to the support members may be chosen with sound engineering judgment. At the distal end, the side actuators 49 may be fixed or grounded with respect to the lift actuators 41. That is to say that when the lift actuators 41 are engaged to raise and lower the support members 35, the side actuators are also raised and lowered accordingly. It will be appreciated that aforementioned configuration will allow for full movement of the support members in a given plane. However, any manner of configuring the actuators 49, 41 for movement of support members 35 may be chosen with sound engineering judgment. It is noted here that the controller 23, 23' may function to operate all of the actuators 49, 41 in synchronous to ensure smooth operation and secure support of the watercraft 6. In this way, the watercraft lock 1, and more specifically the cradle 32, may be engaged to securely suspend the watercraft 6 while water from the various sources 3, 4 is being drained and refilled.

Figure 5:
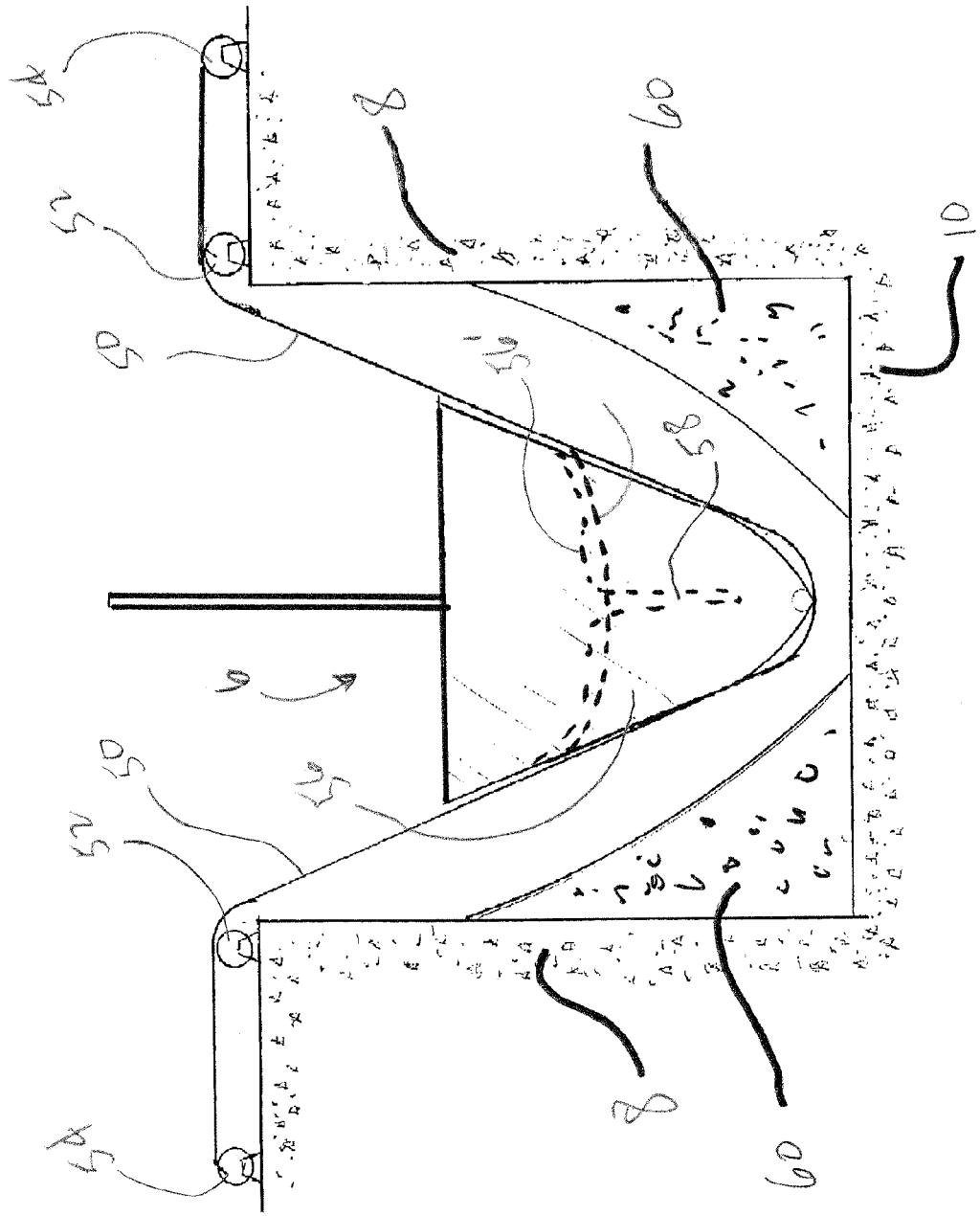
FIG. 5 is a partial cutaway end view of the watercraft lock according to an embodiment of the present invention.
Figure 5A:
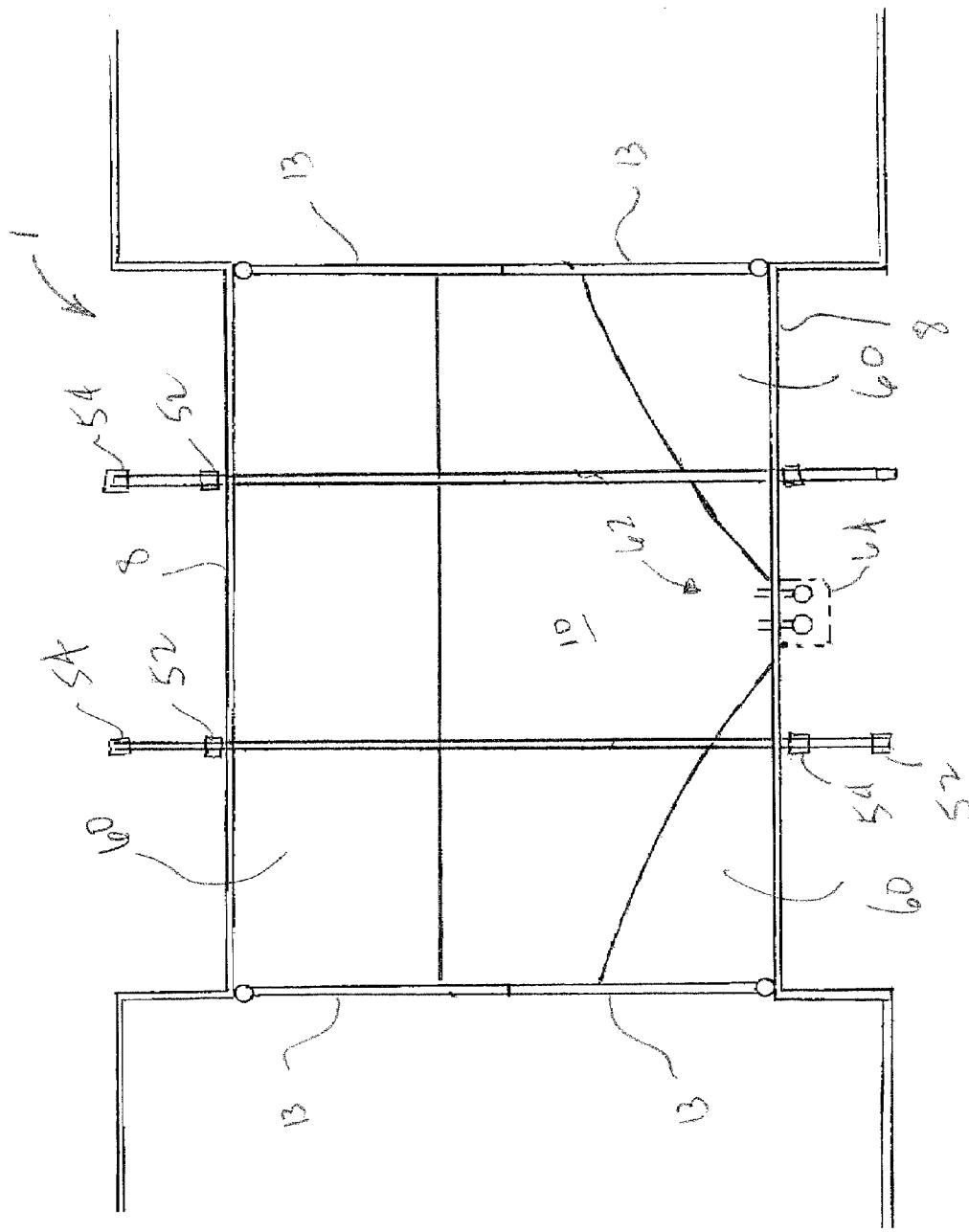
FIG. 5a is a top view the watercraft lock according to an embodiment of the present invention.

Referring to FIGS. 5 and 5a, another embodiment of the lock 1 is shown. In this embodiment, the cradle 32 may comprise a sling 50, which may for example comprise a plurality of straps or a net that extends across at least a portion of the lock 1 between the sidewalls 8. In the Figures, a sling 50 comprising a pair of straps is shown; however, any number of straps may be used. The straps may be formed from any material suitable such as without limitation nylon or polyester. Further, lead weights may be added to the straps to encourage submersion of the straps, which may tend to float otherwise depending on the material used to form straps. As shown in the Figures, sling 50 may extend across the entire width of the lock, and be supported by one or more drums or rollers. A guide roller 52 may be located at or near the edge of the lock sidewall 8 to prevent sling 50 from rubbing or becoming abraded from the edge of the lock sidewall 8. The ends of a sling 50 may be fixed or attached to a roller or drum 54 to adjust the length and/or tension of the sling 50. In practice, after a watercraft 6 enters the lock 1, and the water level begins to decrease, the watercraft hull 56 will come to rest in the sling 50, i.e., cradle 32. Generally, sling 50 allows the watercraft 6 to arrive at a central and stable resting position within sling 50 as the water level decreases. However, a pole or other devise may be used to assist in centering the watercraft 6 in cradle 32. If a watercraft hull or keel 56' (represented in part by dashed lines) includes an extension, such as for example a centerboard 58 (represented by dashed lines), the cradle 32 may remain near the bottom of the lock 1 as the watercraft 6 enters the lock 1 to allow the extension or centerboard 58 to pass without becoming caught in the sling 50. Once the watercraft 6 is properly positioned within the lock 1, the sling 50, or cradle 32, may be raised to engage the hull 56' of the watercraft 6 to prevent the extension or centerboard 58 from becoming damaged by contacting the bottom of the lock 1 as the water level decreases. Again, the length of the sling 50 may be adjusted by the rollers/drums 54, and, in addition to or in the alternative, the sling 50 may shortened by detaching the sling 50 from the rollers/drums 54 and reattaching the same at a shortened length. Also note, in FIG. 5, a mass 60 is placed between the sidewalls 8 and the bottom or base 10. This mass displaces water so to reduce the amount of water used to fill the lock, which increases the life of the pumps and increases the time to empty and fill the lock 1 (that is, the water-retaining chamber of the lock 1). The masses 60 on either side of the lock 1 may be differently shaped and sized, and each side may contain multiple masses. Masses 60 may be formed of any suitable material, in whole or in part, such as without limitation formed, poured, or sprayed concrete or mortar. Spray concrete or mortar includes shotcrete and gunite, and may be reinforced, such as by steel rods, steel mesh, and/or fibers. The masses may form a channel 62 that directs water flow to the pumps or sump 64.

Figure 6:
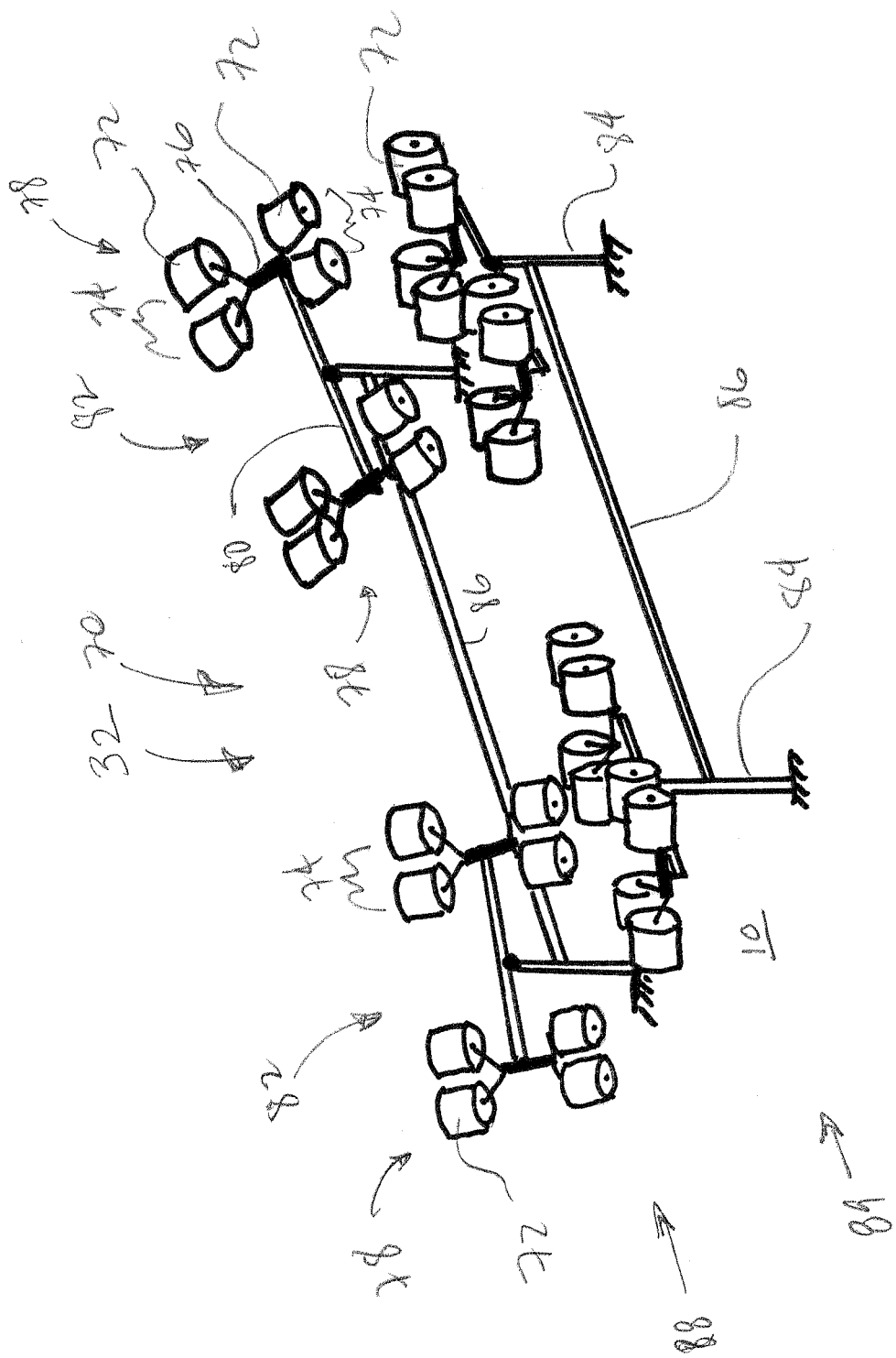
FIG. 6 is a perspective view of a cradle according to an embodiment of the present invention.

Referring to FIG. 6, an alternative embodiment of the cradle 32 is shown. In this embodiment, a plurality of rollers 72 is provided. The rollers may be formed of any suitable material, including without limitation rubber, plastic, wood, or any other polymeric material. It is contemplated that the roller-style cradle 70 may operate similarly to the roller-type boat trailers. The rollers-style cradle 70 includes a plurality of rollers 72 forming a first cradle side 88 and a second cradle side 89. It is contemplated that each side 88, 89 may be joined through a central frame, or may engage the lock 1 independently. The rollers 72 may be connected in pairs via a single shaft, or pairs of rollers 74 may attach to a second pair of rollers 74 via a common shaft 76 to form a set of rollers 78, as shown in FIG. 6. It is contemplated that the pair of rollers 74 may comprise a plurality of rollers, i.e., more than a pair of rollers. Each set of rollers 78 may be fixed to or pivot on a shaft 80, where shaft 80 joins two or more sets of rollers 78 to form a group of sets 82. The group 82 may pivot upon support 84 or cross-member 86. Cross-member 86 may exist to provide lateral support and strength to cradle 32, 70. It is contemplated that support 84 may raise and lower, such as by means of a cylinder. The pivotability of roller sets 78 and/or roller groups 82 allow the cradle 32, 70 to adapt to a variety of watercraft hull shapes and sizes, including by way of example those of sailboats, powerboats, and pontoon boats. Further, the central opening between side supports 88 and 89 allows centerboards or other hull/keel extensions to pass freely through cradle 70. With the further assistance of the rollers, the watercraft 6 may naturally become substantially centered within the cradle 70 as the water level decreases. Again, a pole or other devise may be used to assist with the centering of watercraft 6. It is also contemplated that the rollers may be substituted with pads, which may be made of foam, rubber, wood, or any other suitable material.

With respect to all of the Figures, operation of the watercraft lock 1 will now be described. A watercraft 6 desirous of moving between two separated bodies of water may enter into the watercraft lock 1 according to the embodiments described herein. Doors 13 at a first end 15 of the watercraft lock 1 may be opened, via the controller 23, thereby intermixing or flooding the interior region of the watercraft lock 1 with water from the first body of water. The watercraft 6 may then enter the watercraft lock 1 where the doors 13 may be subsequently closed creating a flow barrier between the water of the first body and the water within the interior region. An operator may then engage the cradle 32, via controller 23, to bring the cradle 32 into supporting engagement with the bottom and/or sides of the watercraft 6. This may be desired when the watercraft 6 has a centerboards 58 extending from its hull or keel (see FIG. 5 for an example), such as with certain sailboats or yachts, as it may be desirous to raise cradle 32 upwards to catch the hull of the vessel before the centerboard contacts the bottom of the lock 1. Otherwise, the watercraft 6 may be lowered into the cradle 32 as the water level decreases. Sensors installed within the watercraft lock 1, such as on the cradle 32, may signal secure contact with, i.e. support of, the watercraft 6. Once the watercraft 6 has been fully supported within the interior region of the watercraft lock 1, the pumps 17 may be turned on to drain water from the interior region. It is noted here that the pumps may be engaged prior to the watercraft's engagement with the cradle 32 respective of the time that it takes to drain water from the interior region. It is noted that drain conduits 19 may be positioned close to the bottom of the tapered base 10 to drain most of the water out of the watercraft lock 1. However, some of water may remain in the bottom of the interior region. It is to be understood that minimal amounts of water from the first water body may not significantly impact the quality of the second water body. With substantially all of the water drained from the watercraft lock 1, sensors, and/or manual activation by an operator, may initiate refilling of the interior region with water from the second body. In this manner, culverts located in the doors and/or sidewalls may be selectively opened for quickly refilling the interior region of the watercraft lock 1. In the instance where the water surface levels of the two bodies of water reside at different elevations, the interior region of the watercraft lock 1 may be filled to a level similar to that of the body of water into which the watercraft will be entering. Upon equalization of the water level within the interior region with the second body of water, the support system 32 may then be disengaged allowing the watercraft to once again float freely in the water. The doors 13 at the distal end of the watercraft lock 1 may then be opened thereby allowing free passage of the watercraft into the second body of water. Of course, it will be realized that operation in reverse will allow watercraft 6 from the second body of water to pass through the watercraft lock 1 and into the first body of water.

An alternate method of transporting a watercraft through the watercraft lock 1 is contemplated where the watercraft is traveling from a fresh water body to a salt water or brackish water body. In this instance, the doors adjacent the fresh water body may open allowing the watercraft 6 to enter the watercraft lock 1. The doors may then close to prevent the free flow of water between the fresh water body and the watercraft lock 1. In this embodiment, rather than completely draining the water from the interior region of the watercraft lock 1, water within the interior region may be drained, or possibly added, only to the extent of matching the current water level of the salt water body. Subsequently, the doors adjacent the salt water body may open allowing the watercraft 6 into the salt water body. Since the fresh water may not significantly affect the salt water body, the step of substantially draining the water from the interior region may be temporarily by-passed. As such the support system 32 may not be needed to transition the watercraft to the salt water body. When the next watercraft is ready for passage from the fresh water body to the salt water body, the interior region of the watercraft lock 1 may be drained of the salt water and refilled with fresh water thus allowing the next watercraft to enter the watercraft lock 1 without salt water mixing into the fresh water body.

The invention has been described herein with reference to the present embodiments, and it is contemplated that any feature within each embodiment may be used in any other embodiment or variation thereof, and/or may be substituted for any feature of features contained within any other embodiment or variation thereof. Obviously, modifications and alterations will occur to others upon a reading and understanding of this specification. It is intended to include all such modifications and alternations in so far as they come within the scope of the appended claims or the equivalence thereof.

I claim:

1. A watercraft transport lock operating between two bodies of water, the transport lock comprising:
   a water-retaining chamber having a pair of sidewalls, a first end having an at least one door operating between the chamber and a first body of fresh water, and a second end having an at least one door operating between the chamber and a second body of salt water;
   a watercraft cradle configured to at least partially support an associated watercraft when substantially all of the volume of water has been removed from the water-retaining chamber;
   a first fresh water pump for pumping exclusively fresh water between the water retaining chamber and the first body of fresh water; and
   a second salt water pump for pumping exclusively salt water between the water retaining chamber and the second body of salt water.

2. The transport lock as recited in claim 1, wherein each of the at least one doors operate between an open position and a closed position and form a watercraft passage when each of the at least one doors is in the open position.

3. The transport lock as recited in claim 1, wherein a portion of the sidewalls are tapered in a direction inward the water-retaining chamber.

4. The transport lock as recited in claim 1, wherein the structure further includes a pitched bottom.

5. The transport lock as recited in claim 1, wherein the structure further includes a bottom and a water-displacing mass extending between a sidewall and the bottom.

6. The transport lock as recited in claim 5, wherein the mass is at least partially formed of sprayed concrete.

7. The transport lock as recited in claim 1, wherein the elevation of the first body of fresh water is substantially different from the elevation of the second body of salt water.

8. The transport lock as recited in claim 1, wherein the first fresh water pump is in independent fluid communication between the water retaining chamber and the first body of fresh water.

9. The transport lock as recited in claim 1, wherein the second pump is in independent fluid communication between the water-retaining chamber and the second body of salt water.

10. The transport lock as recited in claim 1, wherein the cradle comprises a sling extending across at least a portion of the water-retaining chamber between the sidewalls.

11. The transport lock as recited in claim 1, wherein the cradle comprises a plurality of rollers configured for receiving a watercraft.

12. A method of transporting a boat between a first body of fresh water and a second body of salt water, the method comprising the steps of:
   maneuvering a watercraft into a water-retaining chamber of a lock from a first end of the chamber, the lock including:
      the water-retaining chamber having the first end and a second end, each end including an at least one door that operates between an open and closed position, the first end located between a first body of fresh water and the chamber, the second end located between a second body of salt water and the chamber;
      a first fresh water pump for pumping exclusively fresh water between the water retaining chamber and the first body of fresh water; and
      a second salt water pump for pumping exclusively salt water between the water retaining chamber and the second body of salt water;
   closing the at least one door of the first end, thereby maintaining a volume of fresh water and the watercraft within the chamber;
   pumping substantially all of the volume of fresh water from the water-retaining chamber to the first body of fresh water using the first fresh water pump;
   filling the chamber to a desired level with salt water from the second body of salt water using the second salt water pump; and,
   opening the at least one door of the second end; and
   maneuvering the watercraft from the chamber and into the second body of salt water.

13. The method recited in claim 12, wherein before the step of maneuvering a watercraft into a lock, there further comprises the step of pumping an initial volume of salt water from the chamber of the lock to the second body of salt water using the second salt water pump when the doors are in the closed position, and subsequently filling the chamber with fresh water from the first body of fresh water using the first fresh water pump.

14. The method recited in claim 12, the step of pumping substantially all the fresh water from the chamber includes placing the watercraft into a watercraft cradle of the lock.

15. The transport lock as recited in claim 14, wherein the cradle comprises a sling extending across at least a portion of the water-retaining chamber between the sidewalls.

16. The transport lock as recited in claim 14, wherein the cradle comprises a plurality of rollers configured for receiving a watercraft.

* * * * *